United States Patent Office 2,852,431
Patented Sept. 16, 1958

---

2,852,431

PROCESS FOR THE EXTRACTION AND PURIFICATION OF RELAXIN USING TRICHLORACETIC ACID

Robert L. Kroc, Morris Plains, and George E. Phillips, Morristown, N. J., assignors to Warner-Lambert Pharmaceutical Company, a corporation of Delaware No Drawing. Application May 17, 1954
Serial No. 430,430

10 Claims. (Cl. 167—74)

This invention relates to relaxin and aims to provide an improved process for the extraction and the purification of relaxin.

Relaxin is present in corpora lutea or the ovaries of pregnant hogs and may be extracted therefrom. It is believed to be a hormone of pregnancy and has aroused great interest in the field of medical research. For instance, it has been known to cause uterine cervix relaxation in cows; to increase the dilatability of the uterine cervix in ovariectomized estrogen-primed hogs; to cause definite milk let-down in sheep and to a lesser extent in cows, and to cause marked lobulo-alveolar growth of the mammary gland of a rat; and, in the clinic, it has been found to cause dilation of the uterine cervix in near-term pregnant women who fail to dilate after injections of pitocin and to stop premature labor in certain female patients allowing them to go to term.

Prior to our invention, relaxin was extracted from corpora lutea or hogs' ovaries by methods which were limited in practice to a laboratory scale. Those methods cannot be carried out on a large-scale commercial operation. For instance, Frieden et al. extracted hogs' ovaries by a process involving the employment of ethanol and acetone (Arch. Biochem., 29, 166 (1950); and see Recent Progress in Hormone Research, 8, 336 (1953)). However, their process would require, for 100 kg. of ovaries, 1480 liters (390 gallons) of alcohol, 7,000 liters (1842 gallons) of acetone and centrifugation of sizeable fractions thereof. Albert et al. have employed a process involving the use of ammonium sulfate to precipitate an acid extract of fresh corpora lutea, but 208 kg., or 457 pounds, of ammonium sulfate are required for the treatment of 100 pounds of corpora lutea in their process (Endocrinology, 39, 270 (1946); and see Endocrinology, 34, 103 (1944)). Fevold et al. have described a process involving the use of acid-alcohol (Proc. Soc. Exp. Biol. Med., 24, 604 (1930); J. A. C. S., 52, 3340 (1930); J. A. C. S., 54, 254 (1932), but this process is impractical because of intrinsic difficulties, such as foaming, involved in evaporating, under reduced pressure at 40–45° C. to semi-dryness or a thick paste, about 600 liters of neutralized acid-alcohol extract from 100 kg. of corpora lutea or whole ovaries.

We have discovered that it is possible to extract relaxin from the ovaries of pregnant hogs by a process which can be readily practiced on a commercial scale and which gives a surprisingly high yield of a product hereinafter referred to as "stock powder," and which possesses valuable relaxin potency. In the extraction of relaxin pursuant to our invention, the ovaries of pregnant hogs, which may be fresh or frozen, are ground and subjected to acid extraction followed by treatment with salt and filtration to remove solid material. The acid we prefer to use is dilute hydrochloric acid. A crude form of relaxin is precipitated from the filtrate with trichloracetic acid and this, in turn, is extracted with aqueous acetone. The clear acetone extract is treated with anhydrous acetone to precipitate relaxin which is collected, washed and dried to furnish the stock powder.

In order that our improved method of extracting relaxin in the preparation of stock powder may be fully available to those skilled in the art, specific examples of the practice thereof will be described briefly:

EXAMPLE I 5.7 kgs. of frozen ovaries from pregnant hogs are ground to a fine powder and extracted with 22.8 liters of hydrochloric acid prepared by the addition of 684 mls. of concentrated hydrochloric acid to enough distilled water to make the required volume. The mixture is stirred for 24 hours. At the end of 24 hours, 0.912 kg. of sodium chloride are added to the mixture and stirring continued for 30 minutes. The solid material is removed by filtration. The clear supernatant measures about 22 liters.

The ovarian residue may be re-extracted and filtered again in the same way and the two clear filtrates combined and the residue discarded to obtain an increased yield.

1.1 kgs. of trichloracetic acid are added to the clear supernatant. A precipitate forms which contains the crude relaxin. The precipitate is removed by centrifugation. In a typical case it weighed 476 gms. It is stirred with 1900 mls. of a solution consisting of 80% acetone and 20% water. Stirring is continued for 30 minutes. The residue is removed by centrifugation. In the same typical case the supernatant measured 1580 mls.

The residue is reconstituted with 1.9 liters of a solution containing 70% acetone, 19 gms. of trichloracetic acid, and 28.5 mls. of concentrated hydrochloric acid, brought to volume with distilled water. The trichloracetic acid may be omitted but the hydrochloric acid appears to be necessary to obtain maximum yield. The extraction is continued for 30 minutes and the insoluble portion is removed by centrifugation. In the same typical case 1.82 liters of supernatant were obtained.

The clear supernatants obtained from the first and second extractions of the wet precipitate are combined. In the same typical case, they were found to measure 3,400 mls. The combined supernatants are added to 13.6 liters of anhydrous acetone. A white precipitate of relaxin forms and is removed by centrifugation. 8 gms. of dried powder is a typical yield.

The inorganic ash content of the dried powder is obtained by analysis, and enough powder dissolved in distilled water to form a solution containing 0.7–1.0% of inorganic salts. The solution is adjusted to a pH of about 7. A precipitate sometimes forms when this adjustment is made. If it does, it is removed by centrifugation as the clear supernatant contains the active relaxin principle. To obtain a sterile product, this supernatant is filtered through a sintered glass filter and finally through a filter of a porosity of 1.2 microns or less. If this is carried out using sterile techniques, a stable, sterile solution of relaxin is obtained.

EXAMPLE II 200 lbs. (90.91 kilos) of frozen unselected hog ovaries were spread on stainless steel pans for 4 hours in the refrigerator. The softened glands were then ground through a meat grinder using a perforated plate with ⅛" holes.

The ground meat was stirred in a glass lined tank with 90 gals. (356 liters) of 0.36 normal hydrochloric acid for 20 hours. The suspension was strained through a 40 mesh filter and the turbid filtrate was clarified by centrifugation in a Sharpless super centrifuge. A total of 356 liters of acid extract were obtained.

The acid extract was stirred in a glass lined tank and enough trichloracetic acid was added to make the solution 5% trichloracetic acid. 17.8 kilograms of trichloracetic acid were added. Stirring was continued for one hour and the precipitate which formed was allowed to settle for one hour.

The clear supernatant liquor was drawn off and the remainder was clarified by centrifugation.

The clear supernatant was discarded. The wet precipitate weighed 33.2 kilograms, of which 27.3 kilograms was water. 82.0 liters of acetone was added and the suspension was stirred for 2 hours and allowed to settle for 16 hours. The supernatant was removed by centrifugation.

The residue was stirred with 82.0 liters of a solution which was 75% acetone, 24% water and 1% hydrochloric acid for two hours and allowed to stand for 16 hours. The residue was removed and the supernatant was clarified by centrifugation.

The first acetone-water extract contained 79.5 liters and the second one 68.1 liters. These were each added to four volumes of anhydrous acetone and the precipitates were removed, washed with acetone and dried. The total yield was 292 gms.

The comparative simplicity of our process and the availability thereof for the large-scale production of relaxin is illustrated by the following table:

*Table 1.—Quantities of principal reagents used in extracting relaxin from hog ovaries*

| No. Batches | Size of Batch | | Kilograms Trichloracetic Acid Used/ 100 kg. Ovaries | | Liters Acetone Used/ 100 kg. Ovaries | |
|---|---|---|---|---|---|---|
| | lbs. | kg. | Range | Average | Range | Average |
| 5 | 200 | 91 | 16.5–18.2 | 17.1 | 21.7–34 | 29.7 |
| 5 | 400 | 182 | 17.2–18.9 | 18.4 | 19.7–36.7 | 30.2 |

The biological activity of relaxin is customarily measured in Guinea Pig Units, conventionally expressed, in the case of a solution, as G. P. U./ml., or, in the case of a solid such as the stock powder, as G. P. U./mg.

Relaxin preparations can be shown to be active on guinea pig pubic symphysis by the electrometric method of Catchpole et al. (Endocrinology, 8, 377 (1952); Biochim. Biophys. Acta., 8, 575, Footnote p. 576 (1952)). Sawyer et al. have reported that relaxin preparations may also be assayed by in vitro action on the isolated uterus (The Amer. J. of Physiology, 172, 547 (1953)). However, the measurement of biological activity expressed as G. P. U. is normally determined by palpation of the pubic symphysis of the estrogen-primed animals.

Comparison, in terms of G. P. U., of the biological activity of batches of acid-salt extract of pregnant hog ovaries and stock powder prepared therefrom in accordance with our invention is set forth in the following table:

*Table 2.—Analytical data pertaining to the production of relaxin acid-salt extract and stock powder*

| Batch No. | Weight of ovaries | | Acid—Salt Extract | | | | Stock Powder | | | Yield as percent of unit input |
|---|---|---|---|---|---|---|---|---|---|---|
| | Lb. | kg. | Volume of extract | | G. P. U./ ml. | Total No. of units | gm. | G. P. U./ mg. | Total No. of units | |
| | | | Gal. | L. | | | | | | |
| 10 | 200 | 90.7 | 80 | 303 | 3.0 | 909,000 | 56.5 | 15.0 | 850,000 | 94 |
| 11 | 200 | 90.7 | 80 | 303 | 1.0 | 303,000 | 56.4 | 9.0 | 510,000 | 100 |
| 12 | 200 | 90.7 | 79 | 299 | *1.5 | *448,000 | 76.9 | *5.5 | *423,000 | 95 |
| 13 | 200 | 90.7 | 80 | 303 | 14.0 | 4,240,000 | 79.0 | *79.0 | *6,240,000 | 100 |
| 14 | 200 | 90.7 | 79 | 299 | 3 | 897,000 | 54.0 | *45.0 | *2,430,000 | 100 |
| 15 | 200 | 90.7 | 81 | 307 | — | — | 88.0 | 90.0 | 7,920,000 | — |
| 16 | 200 | 90.7 | 82 | 310 | — | — | 103.0 | *82.5 | 8,500,000 | — |
| 17 | 400 | 181.4 | 165 | 625 | 15 | 9,380,000 | 103.0 | 100.0 | 10,300,000 | 160 |
| 19 | 398 | 180.5 | 181 | 686 | — | — | 135.0 | 40.0 | 5,400,000 | — |
| 20 | 400 | 181.4 | 181 | 686 | — | — | 140.0 | 30.0 | 4,200,000 | — |
| 21 | 200 | 90.7 | 87 | 329 | 4 | 1,316,000 | 50.0 | 15.0 | 750,000 | 57 |
| 22 | 400 | 181.4 | 171 | 648 | — | — | 146.0 | 55.0 | 8,030,000 | — |
| 23 | 400 | 181.4 | 181 | 686 | — | — | 193.0 | 13.0 | 2,520,000 | — |

— Not analysed.
*Average value of two determinations. Percent deviation of the mean from the individual results at most 30%.

Although the stock powder obtained by the procedure which we have described may be used therapeutically, we prefer to subject such stock powder to further purification in order that a relaxin preparation will be provided which is relatively free from inorganic salts and inactive organic contaminants. We have discovered that it is possible to purify stock powder by some or all of the following four procedures:

PROCEDURE A

A solution of stock powder in distilled water is treated with an aqueous solution of a base to raise the pH from the acid side to neutral or a slightly alkaline pH. The resulting precipitate is removed and the mother liquor contains substantially all the original active material in purified form. The purified relaxin may be recovered by precipitation with acetone or by freeze drying. In this purification method the preferred end point of neutralization lies in the pH range 7–9.

PROCEDURE B

A solution of stock powder in distilled water is dialyzed against distilled water until the electrical resistance of the relaxin solution is not less than about 5,000 ohms. The resulting precipitate is removed and the mother liquor contains substantially all the original active material in purified form. The purified relaxin may be recovered by precipitation with acetone or by freeze drying.

PROCEDURE C

A solution of stock powder in distilled water is heated at 60–70° C. for about 15 minutes. The resulting precipitate is then removed and the mother liquor contains substantially all the original active material in purified form. The purified relaxin may be recovered by precipitation with acetone or by freeze drying. The purpose of the heat treatment in this method, is to selectively denature inactive proteins.

PROCEDURE D

A solution of stock powder in distilled water is made about 3% with respect to trichloracetic acid and the resulting precipitate is collected, redissolved in distilled water and the resulting solution is neutralized to about pH 7 with a water soluble base. The resulting precipitate is removed and the remaining mother liquor contains substantially all the original active material in purified form. The purified relaxin may be recovered by precipitation with acetone or by freeze drying. In this method, the selection of 3% as the optimum concentration of trichloracetic acid is based on fractionation experiments illustrated by the data shown in Table 3 wherein it will be noted that the 2.86% trichloracetic acid fraction contains substantially all the relaxin activity but only 47.6% of the total nitrogen initially present.

Although any of the above described procedures may be used singly to raise the purity of a relaxin stock powder, it is advantageous to use several or all of these procedures in succession. Examples of useful sequences whereby the various purification procedures may be applied are: Procedures A, B and C; procedures A, B, C and D; procedures A, C and D; procedures D, A, B and C; procedures D, A and C. In such cases the active, purified material need not be isolated in dry form until the completion of the last of the procedures of a selected sequence.

Examples of selected purification sequences are as follows, with the results obtained thereby summarized in tabular form below:

EXAMPLE III.—FRACTIONAL PRECIPITATION OF RELAXIN WITH TRICHLORACETIC ACID

One ml. of a 10% solution of trichloracetic acid in distilled water was added to 5.0 ml. of a 2% solution of relaxin stock powder which had been previously purified by procedure sequence A, B and C. The resulting precipitate was separated by centrifugation and the remaining mother liquor was treated further with 1.0 ml. of 10% trichloracetic acid solution. The resulting precipitate was separated from the mother liquor by centrifugation.

This fractional precipitation procedure was continued until a total of 8.0 ml. of 10% trichloracetic acid solution had been added to the relaxin solution in 1.0 ml. increments, resulting in the separation of eight fractions (designated "a" to "h") and the remaining mother liquor from fraction h.

All fractions were redissolved in water and the resulting solutions were adjusted to pH 7 and analyzed for nitrogen by the Kjeldahl method, and for relaxin activity by the guinea pig method. The results obtained are shown in the following table:

Table 3.—Purification of relaxin by fractional precipitation with trichloracetic acid (PROCEDURE D)

| Fraction | Percent TCA | Activity in guinea pig units | | | Nitrogen | | Yield (percent of input) | |
|---|---|---|---|---|---|---|---|---|
| | | u./ml. | u./mg. N | Total | mg./ml. | Total mg. | N | Activity |
| a | 1.66 | 110 | 992 | 550 | 0.1195 | 0.60 | 3.77 | 6.6 |
| b | 2.86 | 1,500 | 992 | 7,500 | 1.5133 | 7.57 | 47.55 | 90.4 |
| c | 3.75 | 90 | 303 | 450 | 0.2979 | 1.49 | 9.36 | 5.4 |
| d | 4.45 | | | | 0.2374 | 1.19 | 7.48 | |
| e | 5.00 | | | | 0.1760 | 0.88 | 5.53 | |
| f | 5.46 | | | | 0.0386 | 0.39 | 2.45 | |
| g | 5.84 | | | | 0.0315 | 0.32 | 2.01 | |
| h | 6.16 | | | | 0.0247 | 0.25 | 1.57 | |
| Mother liquor from h | 6.16 | 0 | 0 | 0 | 0.1059 | 2.65 | 16.65 | 0 |
| Total | | | | 8,500 | | 15.34 | 96.37 | 102.4 |
| Starting Material | | | 518 | 8,300 | | 15.92 | | |

EXAMPLE IV.—PURIFICATION OF RELAXIN STOCK POWDER BY THE PROCEDURE SEQUENCE A, B AND C

A solution of 84.5 g. of relaxin stock powder in 2.50 liters of distilled water was adjusted to pH 6.90 with 35.5 ml. of 10% sodium hydroxide solution, added dropwise with efficient agitation. The precipitate was removed by centrifugation and the remaining clear liquid was dialyzed against distilled water at 5° C. to a resistance of 5,000 ohms. The resulting precipitate was removed by centrifugation and the remaining clear liquid was heated to 65° C. and held for 15 minutes at 63–67° C. with constant stirring. The resulting precipitate was removed by centrifugation and the remaining clear liquid was freeze-dried to a powder weighing 39.3 g. The results obtained are shown in the following table:

Table 4.—Purification of relaxin stock powder by the procedure sequence A, B and C

| Designation | Weight, g. | Activity in guinea pig units | | |
|---|---|---|---|---|
| | | u./mg. | u./mg. N | Total× $10^{-6}$ |
| Product | 39.3 | 196 | 1,205 | 7.72 |
| Starting material | 84.5 | 90 | 907 | 7.56 |

EXAMPLE V.—PURIFICATION BY PROCEDURE D OF RELAXIN STOCK POWDER PREVIOUSLY PURIFIED BY PROCEDURE SEQUENCE A, B AND C

To 2175 ml. of a 1.05% solution of relaxin (obtained from relaxin stock powder by purification procedure sequence A, B and C) there was added, gradually and with efficient agitation, 918 ml. of a 10% trichloracetic acid solution. The resulting precipitate was separated by centrifugation, redissolved in 1225 ml. of distilled water and the resulting clear solution was adjusted to pH 6.9 with 27.7 ml. of 1.5 N ammonium hydroxide solution. The resulting precipitate (fraction b) was removed and the remaining mother liquor was poured into 10 volumes of acetone. The resulting precipitate (fraction a) was separated by centrifugation, washed with acetone until the Beilstein test for halogen was negative, and finally dried over phosphorus pentoxide under vacuum at room temperature. Fraction b was washed and dried in the same manner as set forth above for fraction a. The results obtained are shown in the following table:

*Table 5.—Purification by procedure D of relaxin stock powder previously purified by procedure sequence A, B and C*

| Designation | Weight, g. | Activity in guinea pig units | | |
|---|---|---|---|---|
| | | u./mg. | u./mg. N | Total× 10⁻⁶ |
| Fraction a | 16.08 | 180 | 1,140 | 2.90 |
| Fraction b | 2.65 | 75 | 480 | 0.20 |
| Starting Material | 22.85 | 104 | 660 | 2.26 |

EXAMPLE VI.—PURIFICATION OF RELAXIN STOCK POWDER BY PROCEDURE D

To a solution of 5.0 g. of relaxin stock powder in 70 ml. of distilled water, there was added gradually and with efficient agitation, 29 ml. of a 10% trichloracetic acid solution. The resulting precipitate was separated by centrifugation, re-dissolved in 100 ml. of distilled water and the resulting clear solution was adjusted to pH 7.0 with 1.5 N ammonium hydroxide solution. The resulting precipitate (fraction b) was removed and the remaining mother liquor was poured into 10 volumes of acetone. The resulting precipitate (fraction a) was separated by centrifugation, washed with acetone until free from halogen and finally dried over phosphorus pentoxide under vacuum at room temperature. Fraction b was washed and dried in the same manner as set forth above for fraction a. The results obtained are shown in the following table:

*Table 6.—Purification of relaxin stock powder by procedure D*

| Designation | Weight, g. | Activity in guinea pig units | | |
|---|---|---|---|---|
| | | u./mg. | u./mg.N | Total× 10⁻⁶ |
| Fraction a | 1.21 | 100 | 644 | 1.21 |
| Fraction b | 0.49 | 25 | 158 | 0.12 |
| Starting Material | 5.00 | 25 | 280 | 1.25 |

EXAMPLE VII.—PURIFICATION OF RELAXIN STOCK POWDER BY THE PROCEDURE SEQUENCE A, C AND D

A solution of 1.96 g. of relaxin stock powder in 25 ml. of distilled water was adjusted to pH 9 by means of 1 N sodium hydroxide solution, whereupon a precipitate was formed which was removed by centrifugation. The mother liquor was adjusted to pH 7.0 with 1 N hydrochloric acid and the resulting precipitate was removed by centrifugation. The remaining clear liquid was heated to 65° C. for 7 minutes and the resulting precipitate was removed by centrifugation. The remaining clear liquid was diluted to 40 ml. and treated gradually, under efficient agitation, with 20 ml. of a 9% trichloracetic acid solution. The resulting precipitate was separated by centrifugation, redissolved in 50 ml. of distilled water and the resulting solution was adjusted to pH 7.0 with 1.5 N ammonium hydroxide solution whereupon a precipitate (fraction b) was formed which was removed by centrifugation. The remaining clear liquid was poured into 10 volumes of acetone and the resulting precipitate (fraction a) was separated by centrifugation, washed with acetone until free from halogen and finally dried over phosphorus pentoxide under vacuum at room temperature. Fraction b was washed and dried in the same manner as set forth above for fraction a. The results obtained are shown in the following table:

*Table 7.—Purification of relaxin stock powder by the procedure sequence A, C and D*

| Designation | Weight, g. | Activity in guinea pig units | | |
|---|---|---|---|---|
| | | u./mg. | u./mg.N | Total× 10⁻⁶ |
| Fraction a | 0.53 | 125 | 800 | 6.63 |
| Fraction b | 0.13 | | | |
| Starting Material | 1.96 | 50 | 471 | 9.8 |

It will be noted, from an inspection of the foregoing tables, that our invention permits very marked purification of the extracted relaxin and that high yields of the purified products were achieved in all cases.

This application is a continuation-in-part of our co-pending application, Serial No. 273,554, now abandoned, filed February 26, 1952, which will be abandoned in favor of this application.

What is claimed is:

1. The process of preparing relaxin of high purity in good yields which includes extracting ovaries of pregnant animals with aqueous acid, adding salt to the extraction mixture to salt-out impurities, separating insoluble material, adding trichloracetic acid to the extract to form a precipitate containing relaxin, recovering the precipitate which forms, extracting relaxin from said precipitate with aqueous acetone, and precipitating purified relaxin from the aqueous acetone by increasing the acetone concentration thereof.

2. Process as in claim 1, in which the residue from the aqueous acetone extraction is extracted with acidified aqueous acetone, and relaxin is recovered from the resulting extract by increasing its acetone concentration.

3. The process of preparing relaxin which comprises extracting ovaries of pregnant animals with dilute hydrochloric acid, adding salt to the extraction mixture to salt-out impurities, separating insoluble material, adding trichloracetic acid to the extract to form a precipitate containing relaxin, recovering the precipitate, extracting relaxin from said precipitate with aqueous acetone, and precipitating purified relaxin from the acetone extract by increasing the acetone concentration thereof.

4. The process of preparing relaxin which comprises extracting ovaries of pregnant animals with aqueous hydrochloric acid, adding salt to the extraction mixture to salt-out impurities, separating insoluble material, adding trichloracetic acid to the extract to form a precipitate, treating said precipitate with acid acetone to extract relaxin therefrom, and precipitating purified relaxin from the acetone extract by increasing the acetone concentration thereof.

5. The process of preparing relaxin which comprises extracting ovaries of pregnant animals with aqueous acid, adding salt to the extraction mixture to salt-out impurities, separating insoluble material, adding trichloracetic acid to the extract to form a precipitate, treating said precipitate with acetone to extract relaxin therefrom, precipitating relaxin from the acetone extract by increasing the acetone concentration thereof, and purifying said relaxin by treating a solution thereof in distilled water with a base to raise the pH thereof to at least 7.0 thereby precipitating impurities.

6. The process of preparing relaxin which comprises extracting ovaries of pregnant animals with aqueous acid, adding salt to the extraction mixture to salt-out impurities, separating insoluble material, adding trichloracetic acid to the extract to form a precipitate, treating said precipitate with acetone to extract relaxin therefrom, precipitating relaxin from the acetone extract by increasing the acetone concentration thereof, and purifying said relaxin by dialyzing a solution thereof in distilled water against distilled water until the electrical resistance of the relaxin solution is not less than about 5,000 ohms.

7. The process of preparing relaxin which comprises extracting ovaries of pregnant animals with aqueous acid, adding salt to the extraction mixture to salt-out impurities, separating insoluble material, adding trichloracetic acid to the extract to form a precipitate, treating said precipitate with acetone to extract relaxin therefrom, precipitating relaxin from the acetone extract by increasing the acetone concentration thereof, and purifying said relaxin by heating an aqueous solution thereof at about 60° to about 70° C. for about 15 minutes to precipitate impurities.

8. The process of preparing relaxin which comprises extracting ovaries of pregnant animals with aqueous acid, adding salt to the extraction mixture to salt-out impurities, separating insoluble material, adding trichloracetic acid to the extract to form a precipitate, treating said precipitate with acetone to extract relaxin therefrom, precipitating relaxin from the acetone extract by increasing the acetone concentration thereof, and purifying said relaxin by precipitating the same from aqueous solution by making said solution about 3% with respect to trichloracetic acid.

9. Process as in claim 5 in which the solution remaining after precipitating impurities with a base is further purified by dialyzing said solution against distilled water until the electrical resistance is not less than about 5000 ohms to precipitate impurities, removing the precipitate, and then heating the remaining liquid to about 65° C. for about 15 minutes to precipitate further impurities therefrom.

10. Process as in claim 5 in which the solution remaining after precipitating impurities with a base is further purified by dialyzing said solution against distilled water until the electrical resistance is not less than about 5000 ohms to precipitate impurities, removing the precipitate, and then heating the remaining liquid to about 65° C. for about 15 minutes to precipitate further impurities therefrom, removing the second precipitate, and thereafter precipitating purified relaxin from the remaining solution by making said solution about 3% with respect to trichloracetic acid.

References Cited in the file of this patent

UNITED STATES PATENTS 2,073,354    Schoeller _____ Mar. 9, 1937

OTHER REFERENCES

Albert et al.: Endocrinology, vol. 40, June 1947, pp. 370–374.

Hisaw et al.: Vitamins and Hormones, vol. 8, 1950, pp. 164–166.

Frieden et al.: Recent Progress in Hormone Res., vol. 8, 1953, pp. 335–338.

Frieden: Archives of Biochemistry, vol. 29, December 1950, pp. 166–178.